United States Patent [19]

Sipple

[11] 4,167,778
[45] Sep. 11, 1979

[54] INVALID INSTRUCTION CODE DETECTOR

[75] Inventor: Ralph E. Sipple, Shoreview, Minn.

[73] Assignee: Sperry Rand Corporation, New York, N.Y.

[21] Appl. No.: 873,470

[22] Filed: Jan. 30, 1978

Related U.S. Application Data

[63] Continuation of Ser. No. 635,814, Nov. 28, 1975, abandoned, which is a continuation of Ser. No. 398,604, Sep. 19, 1973, abandoned.

[51] Int. Cl.² .......................................... G06F 11/00
[52] U.S. Cl. ................................................... 364/200
[58] Field of Search ... 364/200 MS File, 900 MS File, 364/300; 235/312

[56] References Cited

U.S. PATENT DOCUMENTS

| 3,444,522 | 5/1969 | Polhemus | 235/312 |
| 3,611,437 | 10/1971 | Varadi et al. | 365/104 |
| 3,631,405 | 12/1971 | Hoff et al. | 364/200 |
| 3,806,878 | 4/1974 | Edstrom | 364/200 |
| 3,831,148 | 8/1974 | Greenwald et al. | 364/200 |
| 3,949,372 | 4/1976 | Brioschi | 364/200 |

Primary Examiner—Mark E. Nusbaum
Attorney, Agent, or Firm—John L. Rooney; Kenneth T. Grace; Marshall M. Truex

[57] ABSTRACT

A read-only memory, adapted to be addressed by the operation code portion of a computer instruction word, stores at addressable locations therein a flag indicating whether a particular combination of operation code bits is a valid combination.

4 Claims, 3 Drawing Figures

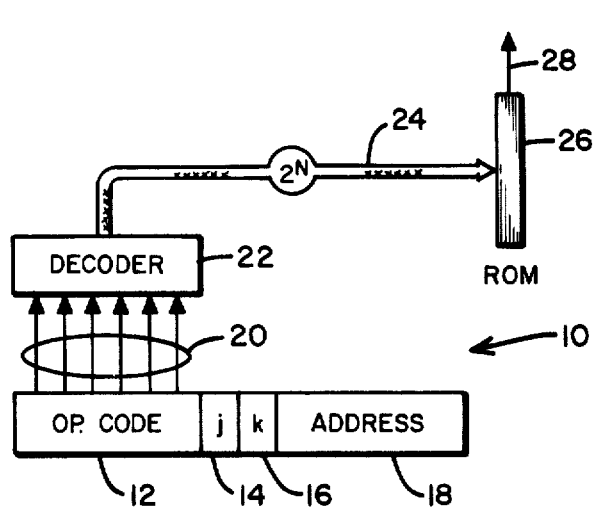
Fig. 1
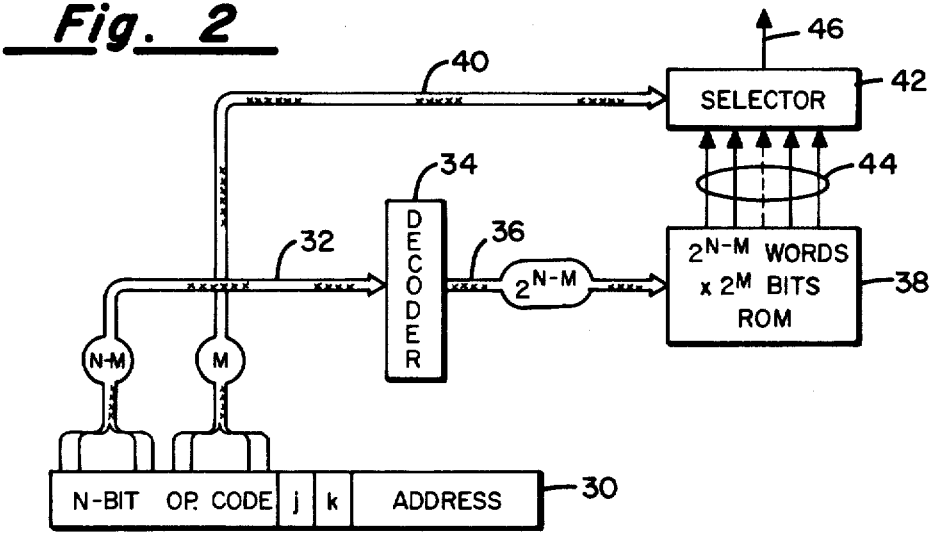
Fig. 2
| | | | | | DECODED VALUE OF BITS $2^2, 2^1, 2^0$ | | | | | | | |
|---|---|---|---|---|---|---|---|---|---|---|---|---|
| $2^7$ | $2^6$ | $2^5$ | $2^4$ | $2^3$ | 0 | 1 | 2 | 3 | 4 | 5 | 6 | 7 |
| 0 | 0 | 0 | 0 | 0 | | | | | 1 | 1 | 1 | 1 |
| 0 | 0 | 0 | 0 | 1 | | | 1 | | | | | |
| 0 | 0 | 0 | 1 | 0 | | 1 | | | | | | |
| 0 | 0 | 0 | 1 | 1 | 1 | 1 | 1 | 1 | | | | |
| 0 | 0 | 1 | 0 | 0 | | | | | | | | |
| 0 | 0 | 1 | 0 | 1 | | | | | | | | |
| 0 | 0 | 1 | 1 | 0 | | | | | | | | |
| 0 | 0 | 1 | 1 | 1 | | | | | | | | |
| 0 | 1 | 0 | 0 | 0 | 1 | 1 | 1 | 1 | | | | |
| 0 | 1 | 0 | 0 | 1 | | | | | | | | |
| 0 | 1 | 0 | 1 | 0 | 1 | 1 | 1 | | | | | |
| 0 | 1 | 0 | 1 | 1 | 1 | | | 1 | 1 | | 1 | 1 |
| 0 | 1 | 1 | 0 | 0 | | | | | | | | |
| 0 | 1 | 1 | 0 | 1 | | | | | | | | |
| 0 | 1 | 1 | 1 | 0 | | | | | | | | |
| 0 | 1 | 1 | 1 | 1 | | | | | | | | |
| 1 | 0 | 0 | 0 | 0 | 1 | 1 | 1 | | | | | |
| 1 | 0 | 0 | 0 | 1 | 1 | 1 | 1 | | | | | |
| 1 | 0 | 0 | 1 | 0 | 1 | | 1 | 1 | 1 | 1 | 1 | 1 |
| 1 | 0 | 0 | 1 | 1 | 1 | 1 | | 1 | | | | |
| 1 | 0 | 1 | 0 | 0 | | | | | | | | |
| 1 | 0 | 1 | 0 | 1 | | | | | | | | |
| 1 | 0 | 1 | 1 | 0 | 1 | | | | | | | |
| 1 | 0 | 1 | 1 | 1 | 1 | | | | | | | |
| 1 | 1 | 0 | 0 | 0 | | | | | | | | |
| 1 | 1 | 0 | 0 | 1 | | | | | | | | |
| 1 | 1 | 0 | 1 | 0 | | 1 | 1 | 1 | 1 | 1 | 1 | |
| 1 | 1 | 0 | 1 | 1 | | | | | 1 | 1 | | |
| 1 | 1 | 1 | 0 | 0 | | | | | | | | |
| 1 | 1 | 1 | 0 | 1 | | | | | | | | |
| 1 | 1 | 1 | 1 | 0 | | | | | | | | |
| 1 | 1 | 1 | 1 | 1 | | | | | | | | |
| MEMORY ADDR. | | | | | MEMORY | | | | | | | |
Fig. 3

INVALID INSTRUCTION CODE DETECTOR

This is a continuation of application Ser. No. 635,814, now abandoned, filed Nov. 28, 1975 as a continuation of application Ser. No. 398,604, now abandoned, filed Sept. 19, 1973.

BACKGROUND OF THE INVENTION

In practically all automatic general purpose digital computers, problems are solved by executing a number of instruction words comprising the computer program. An instruction word is a combination of binary digits (bits) which define the arithmetic or logical operation to be performed and also the addresses at which operands to be manipulated are stored. The portion of the instruction word defining the operation to be performed is commonly called the "operation code" or op. code. The number of discrete operations that can be performed by given computer is a matter of design choice and in prior art computers there may be as few as five instructions for small special purpose computers or more than one hundred for larger, more expensive, general purpose systems.

It is only by sheer coincidence that the number of instructions included in the instruction repertoire of a machine is a number equal to an integral power of two. Hence, the number of bits comprising the op. code portion of an instruction word will often define more binary combinations than are needed to define the valid instructions that may be carried out by the computer. For example, if a machine is designed to execute 140 distinct instructions, the op. code would have to include eight bits since the number 140 is in the range $2^7 < 140 < 2^8$. With $2^8$ bits, however, there are 256 possible combinations so that of this number there would be 116 possible invalid codes.

It is desirable that means be provided for detecting when an invalid code is present in the computer's instruction register and for generating an error interrupt signal so that proper remedial action may be taken. In prior art systems, such as described at column 31 of the Cheney et al U.S. Pat. No. 3,266,020, a rather complex instruction code translator is provided for decoding all of the instruction code bits and the outputs from the translator defining invalid codes are OR'ed together to produce the requisite error interrupt signal. Such a translator requires a multiplicity of logic circuits, adding to the cost of the computer and oftentimes slowing down the instruction execution rate.

To obviate this problem, the present invention provides a so-called "read-only" memory (ROM) connected to the instruction register of the computer such that the op. code bits are interpreted as addresses. Stored at each address in the ROM corresponding to an invalid instruction code is a logical "0" signal while a logical "1" signal is stored at each address corresponding to a valid instruction code. Hence, each time a new instruction word is entered into the instruction register, a "1" or a "0" signal, hereinafter referred to sometimes as a "flag" bit, will be read out from the ROM and thereby indicate whether the op. code is valid or invalid, respectively.

OBJECTS

It is accordingly an object of the present invention to provide a novel arrangement for sensing and indicating whether an instruction word being processed falls into a predetermined class.

Another object of the invention is to provide a read only memory having stored therein at addressable locations a flag bit indicative of whether the op. code of an instruction word currently in the instruction register of the computer is of a given class.

Still another object of the invention is to provide a novel means for indicating the presence of an invalid instruction word in the computer's instruction register.

These and other objects and advantages of the invention will become obvious to those skilled in the art from a reading of the following detailed description of the invention as depicted in the accompanying drawings.

DESCRIPTION OF THE DRAWINGS

FIG. 1 illustrates one embodiment of the invention;
FIG. 2 illustrates an alternate embodiment; and
FIG. 3 indicates the memory assignment for valid instruction code flags in an illustrative example.

DESCRIPTION OF THE PREFERRED EMBODIMENTS

Referring first to FIG. 1 there is shown by means of a logical block diagram, an arrangement for producing a flag bit in the event that the instruction word to be processed is of a predetermined class; more specifically, whether it involves an invalid op. code. As is illustrated, there is provided a stable set of inputs comprising an instruction register 10 adapted to hold an instruction word undergoing processing. The instruction word contained in register 10 may include an op. code portion 12, one or more special designators 14, 16 and a plurality of address bits 18 used to access operands or other instructions from the main memory of the computer. The bits of the instruction word comprising the op. code are applied over the lines 20 to the input of a decoder network 22 which examines the bit permutations of the op. code and produces a signal on one of the $2^N$ lines in cable 24 leading to the read-only memory (ROM) 26.

As is well known in the art, read-only memories are, in general, memories in which data is permanently and usually unalterably stored and may be accessed by addressing memory locations. Many implementations of ROM's are known in the art. They have been fabricated of diode matrices, resistor matrices, capacitor arrays, hard-wired logic elements and semiconductor arrays. Many of these devices fall into the category of programmable read-only memories (PROM's) in that they are designed so that a user may program it to store a given information, but once stored, the information cannot be altered. PROM devices are also referred to as write once-read often memories. Since such devices are so well known, it is not believed necessary for an understanding of the present invention to describe any one such ROM device in great detail.

In the embodiment of FIG. 1, the ROM 26 consists of $2^N$ words each only 1 bit in length. Hence, each time a new op. code is entered into the instruction register 10, one of the $2^N$ bit words permanently stored in ROM 26 will be read out on output line 28. The ROM 26 is preprogrammed to store at addresses corresponding to valid op. codes a 1-bit word of predetermined binary significance (a "1" or a "0") and a word of opposite significance is stored at all other addresses corresponding to invalid op. codes. Therefore, upon entry of a new op. code in the register 10, either a "1" signal or a "0"

signal will appear on line 28 as a flag bit that the op. code is valid or invalid.

Semiconductor ROM's and associated decoders and output selectors made by using large scale integration techniques are commercially available as integrated circuit chips. For example, reference is made to the article entitled "Applying the Versatile MOS ROM" which appears in the January 1970 issue of *Electronic Products* magazine. These chips are normally configured in a so-called "dual, in-line" arrangement, i.e., a row of leads extend from two sides of a rectangular package with the individual leads of one row in alignment with those in the other row.

The embodiment of FIG. 2 shows the manner in which a standard, commercially available integrated circuit ROM chip can be used to generate a flag bit upon detection that the instruction is a member of a class of predetermined characteristics. As in FIG. 1, the computer instruction word is entered into an instruction register 30 and temporarily held there while the instruction is being executed by the computer. In order to test the validity or other characteristic of the instruction, the highest order N-M bits of the N-bit op. code are applied by way of a cable 32 to the input of a decoder network 34. The decoder examines the bit permutations of the N-M bits applied thereto and in response, produces a signal on one of the $2^{N-M}$ lines in cable 36 which is used to uniquely select one out of the $2^{N-M}$ words previously permanently entered into the ROM 38. In practice, the decoder 34 is an integral portion of the commercially available ROM chip 38, but for purposes of explaining the operation of the invention, the decoder is pictured as a separate entity.

The ROM chip 38 is shown as comprising $2^{N-M}$ words, each $2^M$ bits in length where N is equal to the number of bits in the op. code of the instruction and M is an integer lying in the range $N > M \geq 0$. The remaining M bits of the N bit op. code are applied over lines in cable 40 to a selector network 42. The selector network receives as its inputs on lines 44 the bits comprising the word addressed by the N-M bits of the op. code and serves to select one bit thereof as determined by the bit permutation of the M bits applied over the lines in cable 40. Depending upon whether this bit is a binary "1" or a "0", a flag bit will be produced on line 46 to indicate the validity of the instruction currently being processed.

To facilitate the understanding of the invention, an example will be given. Let it be assumed that the op. code is 8 bits in length (N=8) and that a 32 word×8-bit/word chip is used for ROM 38. Since 5 bits are all that are needed to select 32 words ($2^5=32$), the most significant 5 bits of the op. code are applied to the decoder 34 via lines 32. The remaining least significant 3 bits (M=3) of the op. code are applied over lines 40 to the selector 42. With these three bits, the selector 42 can uniquely select one of the eight output bit lines 44 from ROM 38. Assume now that of the 256 possible op. codes that can be represented by 8 bits, that only the following 61 represent valid ones.

TABLE I

| | | | VALID | OP | CODES | | | | | | | | | | |
|---|---|---|---|---|---|---|---|---|---|---|---|---|---|---|---|
| $2^7$ | $2^6$ | $2^5$ | $2^4$ | $2^3$ | $2^2$ | $2^1$ | $2^0$ | $2^7$ | $2^6$ | $2^5$ | $2^4$ | $2^3$ | $2^2$ | $2^1$ | $2^0$ |
| 0 | 0 | 0 | 0 | 0 | 1 | 0 | 0 | 0 | 1 | 0 | 1 | 1 | 0 | 0 | 0 |
| 0 | 0 | 0 | 0 | 0 | 1 | 0 | 1 | 0 | 1 | 0 | 1 | 1 | 0 | 0 | 1 |
| 0 | 0 | 0 | 0 | 0 | 1 | 1 | 0 | 0 | 1 | 0 | 1 | 1 | 0 | 1 | 0 |
| 0 | 0 | 0 | 0 | 0 | 1 | 1 | 1 | 0 | 1 | 0 | 1 | 1 | 0 | 1 | 1 |
| 0 | 0 | 0 | 0 | 1 | 0 | 1 | 0 | 1 | 0 | 0 | 0 | 0 | 0 | 0 | 0 |
| 0 | 0 | 0 | 1 | 0 | 0 | 1 | 0 | 1 | 0 | 0 | 0 | 0 | 0 | 0 | 1 |
| 0 | 0 | 0 | 1 | 0 | 1 | 0 | 0 | 1 | 0 | 0 | 0 | 0 | 0 | 1 | 0 |
| 0 | 0 | 0 | 1 | 0 | 1 | 0 | 1 | 0 | 0 | 0 | 1 | 0 | 0 | 0 | 0 |
| 0 | 0 | 0 | 1 | 0 | 1 | 1 | 0 | 0 | 0 | 0 | 1 | 0 | 0 | 0 | 1 |
| 0 | 0 | 0 | 1 | 0 | 1 | 1 | 1 | 1 | 0 | 0 | 1 | 0 | 0 | 0 | 0 |
| 0 | 0 | 0 | 1 | 1 | 0 | 0 | 0 | 1 | 0 | 0 | 1 | 0 | 0 | 0 | 1 |
| 0 | 0 | 0 | 1 | 1 | 0 | 0 | 1 | 1 | 0 | 0 | 1 | 0 | 0 | 1 | 0 |
| 0 | 0 | 0 | 1 | 1 | 0 | 1 | 0 | 1 | 0 | 0 | 1 | 0 | 0 | 1 | 1 |
| 0 | 0 | 0 | 1 | 1 | 0 | 1 | 1 | 1 | 0 | 0 | 1 | 0 | 1 | 0 | 0 |
| 0 | 1 | 0 | 0 | 0 | 0 | 0 | 0 | 1 | 0 | 0 | 1 | 0 | 1 | 0 | 1 |
| 0 | 1 | 0 | 0 | 0 | 0 | 1 | 1 | 1 | 0 | 0 | 1 | 0 | 1 | 1 | 0 |
| 0 | 1 | 0 | 0 | 0 | 0 | 1 | 0 | 1 | 0 | 0 | 1 | 0 | 1 | 1 | 1 |
| 0 | 1 | 0 | 0 | 0 | 1 | 0 | 1 | 1 | 0 | 0 | 1 | 1 | 0 | 0 | 0 |
| 0 | 1 | 0 | 0 | 0 | 1 | 1 | 0 | 1 | 0 | 0 | 1 | 1 | 0 | 0 | 1 |
| 0 | 1 | 0 | 0 | 0 | 1 | 1 | 1 | 1 | 0 | 1 | 1 | 0. | 0 | 0 | 0 |
| 0 | 1 | 0 | 0 | 1 | 0 | 0 | 0 | 1 | 0 | 1 | 1 | 1 | 0 | 0 | 0 |
| 0 | 1 | 0 | 0 | 1 | 0 | 0 | 1 | 1 | 1 | 0 | 1 | 0 | 0 | 0 | 1 |
| 0 | 1 | 0 | 0 | 1 | 0 | 1 | 0 | 1 | 1 | 0 | 1 | 0 | 0 | 1 | 0 |
| 0 | 1 | 0 | 0 | 1 | 0 | 1 | 1 | 1 | 1 | 0 | 1 | 0 | 0 | 1 | 1 |
| 0 | 1 | 0 | 1 | 0 | 0 | 0 | 0 | 1 | 1 | 0 | 1 | 0 | 1 | 0 | 0 |
| 0 | 1 | 0 | 1 | 0 | 1 | 0 | 0 | 1 | 1 | 0 | 1 | 0 | 1 | 0 | 1 |
| 0 | 1 | 0 | 1 | 0 | 1 | 0 | 1 | 1 | 1 | 0 | 1 | 0 | 1 | 1 | 0 |
| 0 | 1 | 0 | 1 | 0 | 1 | 1 | 0 | 1 | 1 | 0 | 1 | 0 | 1 | 1 | 1 |
| 0 | 1 | 0 | 1 | 0 | 1 | 1 | 1 | 1 | 1 | 0 | 1 | 1 | 1 | 0 | 0 |
| 0 | 1 | 0 | 1 | 1 | 1 | 1 | 1 | 1 | 1 | 0 | 1 | 1 | 1 | 1 | 0 |

FIG. 3 illustrates the information stored at each address in the 32 word×8-bit per word ROM. By comparing Table I with FIG. 3, it can be seen that there are sixty-one "1" bits stored in the ROM at addresses represented by the sixty-one valid op. codes. Specifically, the most significant five bits of the op. code select one of thirty-two 8-bit words and the selector 42 allows only one bit of the 8-bit word (the bit defined by the decoded value of the least significant three bits of the op. code) to appear on the flag output line 46. If this bit is a "1", the instruction in register 30 is valid and if the bit is a "0", the instruction is invalid.

Where it is foreseen that the instruction repertoire of a given computer may be expanded in the future, a PROM device is preferred as the read-only memory 26 or 38 in the embodiments of FIGS. 1 and 2. Then, when new instructions are added, additional flags can be programmed into the same physical chip package to indicate the validity or other characteristic thereof. Once the flag bit is programmed, it cannot be erased.

While the present invention has been described in connection with an application of detecting invalid instruction codes, it should be obvious that the same invention may find other applications in digital computers where one desires an indication of whether an instruction is one of a given class. For example, in present day large scale computing systems where a number of "worker programs" may be executed under control of an "executive program", many of the instructions fall into a privileged category meaning that they can only be executed by the executive program and not the worker program. These privileged instructions are identified by certain predefined operation codes. Hence, a ROM pre-programmed to store a flag bit at predetermined locations addressed by the op. code can be used to indicate the privileged or non-privileged status of an instruction. Further, this information, along with the privileged/non-privileged mode identifier bit can be used to determine if the privileged instruction should be executed or not.

It is to be understood that various changes in the details and arrangement of elements which have been described and illustrated herein in order to explain the nature of the invention will occur to and may be made by those skilled in the art upon a reading of this disclosure and such changes are intended to be included within the principle and scope of this invention.

What is claimed is:

1. In a digital computer whose computations are controlled through the execution of a series of computer instructions each containing one of $2^N$ operation codes which are defined by N binary digits of said computer instruction wherein fewer than $2^N$ possible different operation codes are defined as valid, the improved method of indicating the validity of each of said operation codes of each of said computer instructions within said series of computer instructions comprising:
   a. storing within a read-only memory of capacity $2^N$ addressable bits, a flag bit corresponding to each of said $2^N$ possible different operation codes wherein said flag bit is a binary one if said corresponding operation code is defined as valid and a binary zero if said corresponding operation code is not defined as valid;
   b. temporarily storing one of said series of computer instructions currently scheduled for execution by said digital computer;
   c. decoding said operation code of said temporarily stored one of said series of computer instructions currently scheduled for execution by said digital computer to generate an address of said read-only memory;
   d. accessing said flag bit within said read-only memory at said generated address corresponding to said operation code within said temporarily stored one of said series of computer instructions currently scheduled for execution by said digital computer;
   e. signaling said digital computer that said operation code within said temporarily stored one of said series of computer instructions currently scheduled for execution by said digital computer is valid if and only if said accessing revealed that said flag bit corresponding to said operation code is a binary one;
   f. executing said temporarily stored one of said series of computer instructions currently scheduled for execution by said digital computer if said accessing revealed that said flag bit corresponding to said operation code is a binary one; and
   g. repeating steps b through f for each one of said series of computer instructions.

2. In a digital computer whose computations are controlled through the execution of a series of computer instructions each containing one of $2^N$ operation codes which are defined by N binary digits of said computer instructions wherein fewer than $2^N$ possible different operation codes are defined as valid, the improved method for indicating the invalidity of one of said operation codes contained within one of said computer instructions within said series of computer instructions comprising:
   a. storing within a read-only memory of capacity $2^N$ addressable bits, a flag bit corresponding to each of said $2^N$ possible different operation codes wherein said flag bit is a binary one if said corresponding operation code is defined as valid and a binary zero if said corresponding operation code is not defined as valid;
   b. temporarily storing one of said series of computer instructions currently scheduled for execution by said digital computer;
   c. decoding said operation code of said temporarily stored one of said series of computer instructions currently scheduled for execution by said digital computer to generate an address of said read-only memory;
   d. accessing said flag bit within said read-only memory at said generated address corresponding to said operation code within said temporarily stored one of said series of computer instructions currently scheduled for execution by said digital computer;
   e. signaling said digital computer that said operation code within said temporarily stored one of said series of computer instructions currently scheduled for execution by said digital computer is invalid if and only if said accessing reveals that said flag bit corresponding to said operation code is a binary zero;
   f. executing said temporarily stored one of said series of computer instructions currently scheduled for execution by said digital computer if said accessing revealed that said flag bit corresponding to said operation code is a binary one; and
   g. repeating steps b through f for each one of said series of computer instructions.

3. In a digital computer whose computations are controlled through the execution of a series of computer instructions each containing one of $2^N$ operation codes which are defined by N binary digits of said computer instruction wherein fewer than $2^N$ possible different operation codes are defined as valid, the improved method of indicating the validity of each of said operation codes of each of said computer instructions within said series of computer instructions comprising:
   a. storing within a read-only memory of capacity $2^N$ addressable bits, a flag bit corresponding to each of said $2^N$ possible different operation codes wherein said flag bit is a binary zero if said corresponding operation code is defined as valid and a binary one if said corresponding operation code is not defined as valid;

b. temporarily storing one of said series of computer instructions currently scheduled for execution by said digital computer;

c. decoding said operation code of said temporarily stored one of said series of computer instructions currently scheduled for exectuion by said digital computer to generate an address of said read-only memory;

d. accessing said flag bit within said read-only memory at said generated address corresponding to said operation code within said temporarily stored one of said series of computer instructions currently scheduled for execution by said digital computer;

e. signaling said digital computer that said operation code within said temporarily stored one of said series of computer instructions currently scheduled for execution by said digital computer is valid if and only if said accessing revealed that said flag bit corresponding to said operation code is a binary zero;

f. executing said temporarily stored one of said series of computer instructions currently scheduled for execution by said digital computer if said accessing revealed that said flag bit corresponding to said operation code is a binary zero; and g. repeating steps b through f for each one of said series of computer instructions.

4. In a digital computer whose computations are controlled through the execution of a series of computer instructions each containing one of $2^N$ operation codes which are defined by N binary digits of said computer instructions wherein fewer than $2^N$ possible different operation codes are defined as valid, the improved method for indicating the invalidity of one of said operation codes contained within one of said computer instructions within said series of computer instructions comprising:

a. storing within a read-only memory of capacity $2^N$ addressable bits, a flag bit corresponding to each of said $2^N$ possible different operation codes wherein said flag bit is a binary zero if said corresponding operation code is defined as valid and a binary one if said corresponding operation code is not defined as valid;

b. temporarily storing one of said series of computer instructions currently scheduled for execution by said digital computer;

c. decoding said operation code of said temporarily stored one of said series of computer instructions currently scheduled for execution by said digital computer to generate an address of said read-only memory;

d. accessing said flag bit within said read-only memory at said generated address corresponding to said operation code within said temporarily stored one of said series of computer instructions currently scheduled for execution by said digital computer;

e. signaling said digital computer that said operation code within said temporarily stored one of said series of computer instructions currently scheduled for execution by said digital computer is invalid if and only if said accessing reveals that said flag bit corresponding to said operation code is a binary one;

f. executing said temporarily stored one of said series of computer instructions currently scheduled for execution by said digital computer if said accessing revealed that said flag bit corresponding to said operation code is a binary zero; and g. repeating steps b through f for each one of said series of computer instructions.

* * * * *

UNITED STATES PATENT AND TRADEMARK OFFICE
CERTIFICATE OF CORRECTION

PATENT NO. : 4,167,778
DATED : September 11, 1979
INVENTOR(S) : Ralph E. Sipple

It is certified that error appears in the above-identified patent and that said Letters Patent are hereby corrected as shown below:

Column 4, Table I, the second set of columns ($2^7 - 2^0$) should be spaced in such a way as to clearly indicate that it is a continuation of the first set of columns.

Column 4, Table I, the twenty-second digit in the second $2^3$ column should be deleted and inserted as the twenty-first digit in the right-most ($2^0$) column.

Signed and Sealed this

Twentieth Day of November 1979

[SEAL]

Attest:

RUTH C. MASON
*Attesting Officer*

LUTRELLE F. PARKER
*Acting Commissioner of Patents and Trademarks*